No. 631,812.  
Patented Aug. 29, 1899.
C. A. POLLEY.
ASH PAN FOR HOT BLAST STOVES.
(Application filed Mar. 18, 1899.)
(No Model.)
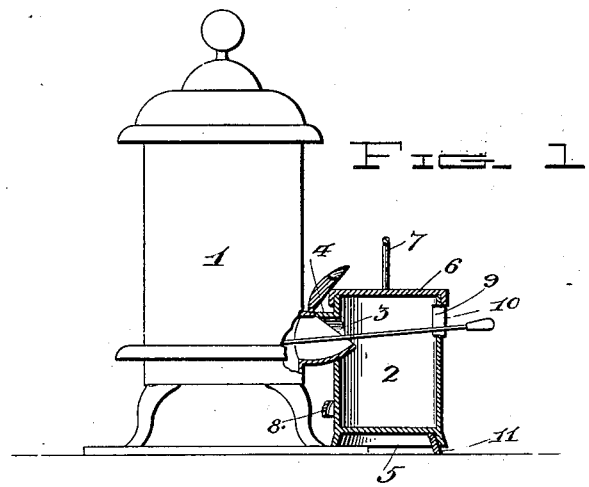
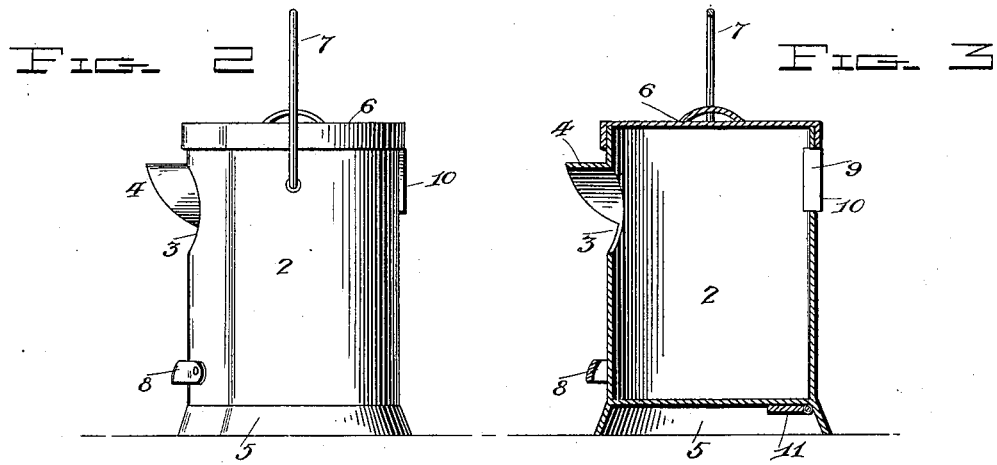
Inventor  
Charles A. Polley,  
by  
H. B. Willson & Co.  
Attorneys
Witnesses
THE NORRIS PETERS CO., PHOTO-LITHO., WASHINGTON, D. C.

UNITED STATES PATENT OFFICE.

CHARLES A. POLLEY, OF EVANSTON, WYOMING.

ASH-PAN FOR HOT-BLAST STOVES.

SPECIFICATION forming part of Letters Patent No. 631,812, dated August 29, 1899.

Application filed March 18, 1899. Serial No. 709,566. (No model.)

*To all whom it may concern:*

Be it known that I, CHARLES A. POLLEY, a citizen of the United States, residing at Evanston, in the county of Uinta and State of Wyoming, have invented certain new and useful Improvements in Ash-Pans for Hot-Blast Stoves; and I do declare the following to be a full, clear, and exact description of the invention, such as will enable others skilled in the art to which it appertains to make and use the same.

The invention has relation to an ash-pan for a hot-blast stove, and in fact for all kinds of stoves in which the door of the ash-pit is too small to permit of the insertion of an ordinary ash-pan.

The object of the invention is to provide a pan of this character, by means of which the ashes may be easily and quickly removed from the stove without spilling and without creating a dust.

With this object in view the invention consists in certain features of construction and combination of parts, which will be hereinafter fully described and claimed.

In the drawings, Figure 1 is a sectional view illustrating the application of my invention. Fig. 2 is a view, on an enlarged scale, of my improved ash-pan; and Fig. 3 is a longitudinal sectional view.

In the drawings, 1 denotes what is known in the art as a "hot-blast stove." This stove is formed with a forwardly-projecting spout, which is provided with a hinged cover.

2 denotes my improved ash-pan, which may be of any suitable construction—that is, circular or polygonal. One side of the pan is provided with an enlarged opening 3, to the upper edge of which is secured a hood 4. The lower end of the pan is provided with a downwardly-depending annular flange 5, which supports the bottom free from contact with the floor.

6 denotes the cover of the ash-pan, and 7 the handle.

8 denotes a hand-grip secured at the forward side of the ash-pan, and 9 denotes a slit formed in the rear side of the pan. Secured within the pan on opposite sides of the slit are two wooden strips 10.

In operation when it is desired to remove the ashes from the stove 1 the hinged cover of the spout of the stove is raised and the pan brought to the stove, so as to permit the spout to project within the opening 3. A poker or rake is now inserted through the opening 3, with its shank resting in the slit 9, and by reciprocating this poker or rake the ashes may be withdrawn from the ash-pot of the stove into the ash-pan without spilling the ashes upon the floor and without creating a dust.

In the reciprocation of the poker or rake it engages the wooden strips secured at the sides of the slit, and thereby prevents the disagreeable screeching noise, which would be occasioned if the strips were not provided.

If desired, I may provide the rear side of the ash-pan with a short folding leg 11, so that when the pan is used for removing ashes from a stove that sits upon a stove-board this leg will correspond in length to the thickness of the said board, thereby insuring a close fit of the pan with the stove-spout. When the stove-board is not in use, this leg may be folded up within the annular depending flange of the pan and the flange rests throughout its entire length upon the floor.

It will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

An ash-pan comprising the body portion formed on one side with an opening and on the opposite side with a narrow slit, a hood secured above said opening, wooden strips secured to said pan at the sides of said slit, a handle secured to said pan below the opening and its hood, an annular supporting-flange secured to the base of the pan, a leg hinged to said pan and adapted when in use to project below the lower edge of the supporting-flange and when not in use to rest against the bottom of the pan, and a cover for said pan, substantially as shown and described.

In testimony whereof I have hereunto set my hand in presence of two subscribing witnesses.

CHARLES A. POLLEY.

Witnesses:
FRED BECKWITH,
FRANK BECKWITH.